(12) United States Patent
Kammerer

(10) Patent No.: US 9,291,190 B2
(45) Date of Patent: Mar. 22, 2016

(54) FIXING DEVICE

(75) Inventor: Bernhard Kammerer, Zell an der Pram (AT)

(73) Assignee: FACC AG, Ried im Innkreis (AT)

( * ) Notice: Subject to any disclaimer, the term of this patent is extended or adjusted under 35 U.S.C. 154(b) by 141 days.

(21) Appl. No.: 13/821,017

(22) PCT Filed: Sep. 6, 2011

(86) PCT No.: PCT/AT2011/000363
§ 371 (c)(1),
(2), (4) Date: Mar. 6, 2013

(87) PCT Pub. No.: WO2012/031310
PCT Pub. Date: Mar. 15, 2012

(65) Prior Publication Data
US 2013/0164094 A1    Jun. 27, 2013

(30) Foreign Application Priority Data
Sep. 6, 2010 (AT) ................................ A 1485/2010

(51) Int. Cl.
| F16B 43/00 | (2006.01) |
| F16B 5/02 | (2006.01) |
| B62D 27/04 | (2006.01) |
| B64D 11/00 | (2006.01) |
| F16F 1/38 | (2006.01) |

(52) U.S. Cl.
CPC ................ *F16B 43/00* (2013.01); *B62D 27/04* (2013.01); *B64D 11/00* (2013.01); *F16B 5/0225* (2013.01); *F16B 5/0241* (2013.01); *F16B 43/001* (2013.01); *F16F 1/3835* (2013.01); *F16F 1/3863* (2013.01); *Y02T 50/46* (2013.01)

(58) Field of Classification Search
USPC ............... 411/546, 539, 85; 52/787.1; 16/2.1; 244/131; 267/141.1, 141.5
See application file for complete search history.

(56) References Cited

U.S. PATENT DOCUMENTS

| 3,895,408 A | * | 7/1975 | Leingang ......................... 16/2.1 |
| 4,295,691 A | * | 10/1981 | Rubenthaler ................. 384/297 |
| 5,520,357 A | * | 5/1996 | Payne et al. ................. 244/118.1 |
| 5,876,024 A | * | 3/1999 | Hain .......................... 267/141.4 |

(Continued)

FOREIGN PATENT DOCUMENTS

| EP | 0751305 A1 | 1/1997 |
| EP | 1792827 A2 | 6/2007 |

(Continued)

*Primary Examiner* — Flemming Saether
(74) *Attorney, Agent, or Firm* — Laurence A. Greenberg; Werner H. Stemer; Ralph E. Locher

(57) ABSTRACT

A device fixes fittings, in particular wall or floor elements in airplanes, to a structure such that no vibrations are generated. The device has a fixing element which is configured on one end for fixing to the structure and on the opposite end for receiving the fittings. The opposite end of the fixing element is movably mounted in a spacer sleeve which can be connected to the fittings to be received and which contains an elongated hole-shaped cross-section, and the opposite end is configured for fixing to the fittings. At least one damping element is provided and disposed between the structure and the fittings. The spacer sleeve has an elongated hole-shaped cross-section, and the one end of the fixing element is formed by a stand or can be connected to a stand. The stand is configured for movably mounting in a rail section that lies on the structure.

7 Claims, 3 Drawing Sheets

(56) References Cited

U.S. PATENT DOCUMENTS

| | | | | |
|---|---|---|---|---|
| 6,158,609 | A * | 12/2000 | Kaiser | 220/480 |
| 6,260,813 | B1 * | 7/2001 | Whitcomb | 248/503.1 |
| 6,318,672 | B1 * | 11/2001 | Traylor | 244/118.5 |
| 6,328,293 | B1 * | 12/2001 | Olsen | 267/140.11 |
| 6,328,513 | B1 * | 12/2001 | Niwa et al. | 411/339 |
| 7,786,629 | B2 | 8/2010 | Fukuda et al. | |
| 7,857,561 | B2 | 12/2010 | Mejuhas et al. | |
| 2008/0003079 | A1 * | 1/2008 | Martinson | |
| 2008/0302060 | A1 * | 12/2008 | Ciprian | |
| 2010/0086377 | A1 * | 4/2010 | de Mola | |
| 2010/0124457 | A1 * | 5/2010 | Cook et al. | 403/409.1 |

FOREIGN PATENT DOCUMENTS

| | | |
|---|---|---|
| EP | 1860006 A1 | 11/2007 |
| GB | 2419854 A | 5/2006 |

* cited by examiner

FIXING DEVICE

BACKGROUND OF THE INVENTION

Field of the Invention

The invention relates to a device for fastening fittings, in particular wall or floor elements in airplanes, to a structure such that no vibrations are generated, including a fastening element which is designed on one end for fastening to the structure and on the opposite end for receiving the fittings, wherein the opposite end of the fastening element is movably mounted in a spacer sleeve that can be connected to the fittings to be received and is designed for fastening to the fittings, and at least one damping element is provided for arrangement between the structure and the fittings.

It is necessary, in particular in airplanes, to connect various fittings such as wall or floor elements to the load-bearing structure of the airplane so as to be free of vibrations or decoupled from vibrations. Apart from airplanes, such fastening elements may, however, also be envisaged where the point is to connect various fittings in a manner decoupled from vibrations.

WO 82/00324 A1 and JP 63074726 A show devices for vibration-free fastening in the manner represented herein.

DE 20 2010 000 965 U1 shows a device for fastening sandwich plates to vehicles.

The damped fastening of a floor element by the aid of appropriately designed, damped feet is, for instance, disclosed in JP 20072777884 A.

A similar construction is described in WO 2008/072982 A1, wherein vertical adjustability can be achieved via a thread provided on the spacer, along which an appropriate element can be moved, on which the floor elements rest.

Finally, US 2007/0262212 A1 shows a fastening device for installing fittings in airplanes, providing adjustability in the vertical direction. However, no vibration damping means is integrated therein.

BRIEF SUMMARY OF THE INVENTION

The object of the present invention consists in providing an above-identified fastening device that enables the vibration-decoupled and adjustable connection of fittings, particularly in airplanes. The weight of the fastening device is to be as low as possible, particularly when applied in airplanes. The drawbacks of known fastening devices are to be avoided or at least reduced.

The object according to the invention is achieved by an above-identified fastening device, wherein the spacer sleeve has an elongated hole-shaped cross-section, and the one end of the fastening element is formed by a foot, or can be connected to a foot, which foot is designed for movable mounting in a rail section arranged on the structure. The movable mounting of the fastening element in the spacer sleeve having an elongated hole-shaped cross-section allows for an adjustability, and hence the compensation of tolerances. When applied in airplanes, such an adjustability is permitted, and even necessary to compensate for tolerances, in the longitudinal direction of the airplane. The at least one damping element allows for a vibration-free or vibration-decoupled fixation. The rail section is arranged on the structure, or is already integrated therein, and the fastening element can be placed therein in any desired position relative to the fittings to be fastened. By the displaceable mounting of the fastening elements in the rail profile, the coarse arrangement of the fittings will be achieved. Fine-tuning for the compensation of tolerances will be effected by the above-described spacer sleeve having an elongated hole-shaped cross-section.

In an advantageous manner, a fixing device for fixing the foot of the fastening element in the rail section is provided. Said fixing device can be configured in various ways as a function of the design of the rail section and of the foot of the fastening element.

The fixing device can, for instance, be formed by a wedge-shaped piece that can snap into respective recesses provided in the rail section. The wedge-shaped piece is formed in correspondence with the recesses provided in the rail section and can snap into the rail section on the desired location on which the fastening element is to be placed, thus preventing the fastening element from moving.

According to an exemplary embodiment of the fastening device, the fastening element is formed by a bolt having a bolt head and a thread. This constitutes a particularly simple and cost-effective and also relatively light-weight embodiment. The fastening element can, of course, also be formed by a bolt formed in one piece with the foot and having a thread on its free end and a nut to be screwed onto it.

In a preferred manner, the at least one damping element is arranged about the spacer sleeve in order to achieve said decoupling in terms of vibration. It goes without saying that even the spacer sleeve itself may be made of a damping material or coated with such a material.

Preferably, at least two damping discs are provided as damping elements, which damping discs are preferably anchored to the spacer sleeve. Such an anchorage can be formed by appropriate anchoring elements provided on the spacer sleeve and penetrating into the elastic material. Such an arrangement allows for the simple and efficient decoupling of possibly occurring vibrations.

In doing so, it will be advantageous if the damping discs are made of silicone rubber. Silicone exhibits good processability and optimum damping properties.

In order to prevent an undesired release of the fastening of the fittings to the fasting element, the bolt can be provided with an anti-twist protection. Such a protection against any undesired release of the bolt can, for instance, be provided by a retainer ring known per se.

In order to safeguard a flow of forces to the structure in the form of a form closure, two discs having ribs on their surfaces oriented to each other can be provided.

The bolt of the fastening element, which is acted upon by elevated forces, is preferably made of steel.

In an advantageous manner, the rail section is made of a light metal such as aluminium.

It will be advantageous, in particular when fastening wall elements to a structure, if the one end of the fastening element is formed by a profile piece, e.g. a T-profile, or can be connected to such a profile piece, which profile piece is connectable to the structure. Instead of providing a profile piece, the end of the fastening element can also be directly connected to the structure. The structure may be comprised of any desired profile or just a plane surface.

The opposite end of the fastening element can be connected to the fittings, in particular the wall element, via the spacer sleeve.

In the following, the present invention will be explained in more detail by way of the accompanying drawings, which illustrate exemplary embodiments of the fastening device. Therein:

DESCRIPTION OF THE INVENTION

Figure 2:
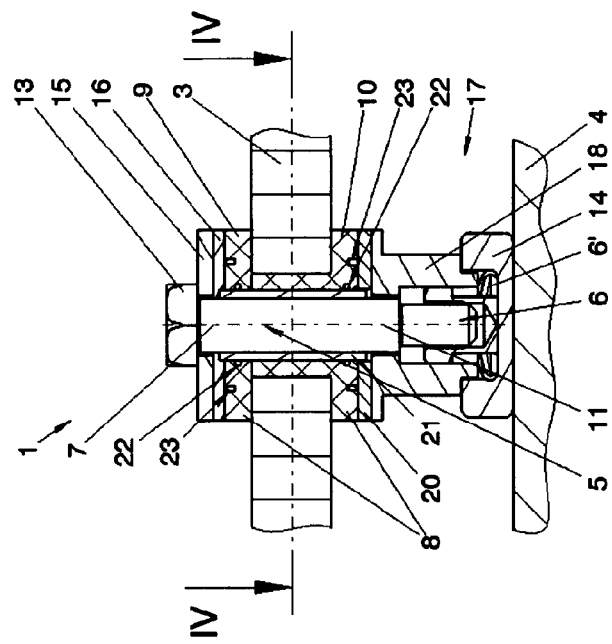
FIG. 2 illustrates a cross section through the embodiment of the fastening device according to FIG. 1, viewed in the longitudinal direction.
Figure 1:
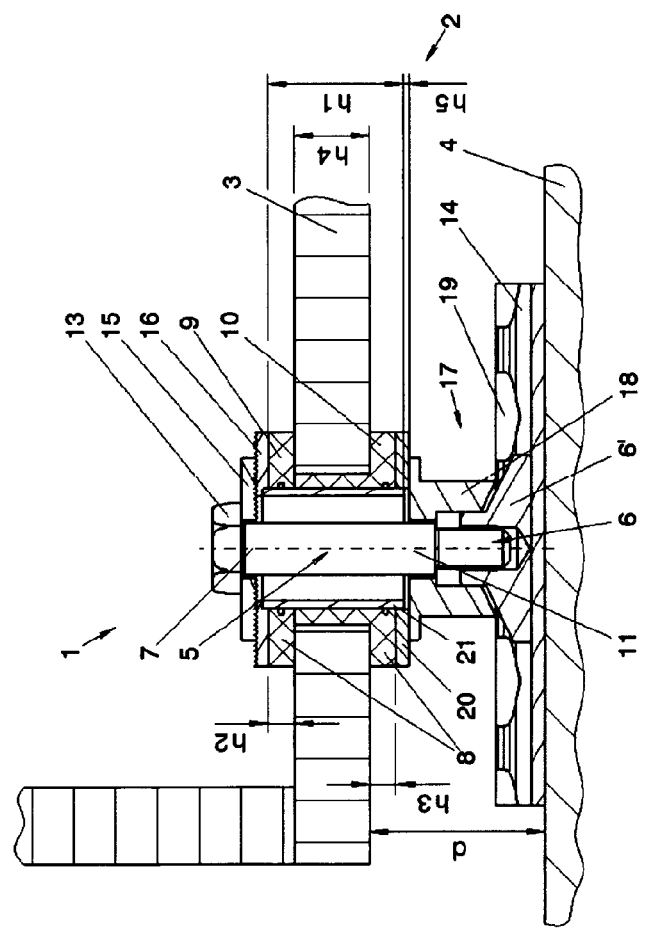
FIG. 1 depicts a cross section through an embodiment of a fastening device for fastening a floor element, for instance in an airplane, viewed transversely to the longitudinal extension of the airplane.

FIGS. 1 and 2 depict an embodiment of a fastening device 1 for fastening fittings 2 comprised of a floor element 3 at a distance d from a structure 4, e.g. in an airplane. In FIG. 1 the fastening device 1 arranged on the fittings 2 is shown transversely to the longitudinal direction of the airplane, in FIG. 2 the fastening device 1 is shown in the longitudinal direction of the airplane. The fastening device 1 comprises a fastening element 5 with an end 6 designed as a foot 6' and configured to be supported on a structure 4. The end 7 located opposite the end 6 or foot 6', of the fastening element 5 is configured to receive the fittings 2, in particular floor element 3. In order to enable the adjustability of the fastening device 1 in the horizontal direction, i.e. in the plane of the structure 4, the foot 6' of the fastening element 5 is displaceably mounted in a rail section 14 arranged on the structure 4. Thus, a coarse displacement of the fastening device 1 is effected via said rail section 14. It is, of course, also possible to form the rail section 14 in one piece with the structure 4, or integrate the same therein. A suitable fixing device 17 may be provided to fix the foot 6' in the rail section 14. Said fixing device 17 can be formed by a wedge-shaped piece 18 that snaps into respective recesses 19 provided in the rail section 14. By fastening the fastening element 5, the foot 6' from below, and at the same time the wedge-shaped piece 18 from above, are pressed against the rail section 14, thus clamping the rail section 14 and enabling a flow of forces into the structure 4.

In order to compensate for tolerances, the opposite end 7 of the fastening element 5 is movably mounted in a spacer sleeve 21 connectable to the fittings 2 to be received and having an elongated hole-shaped cross section (cf. FIG. 4), and is designed to be fixed to the fittings 2. Due to the shape of the spacer sleeve 21 and its arrangement on the floor element 3, adjustability in the longitudinal direction to compensate for tolerances is possible. By contrast, the fastening device 1 is not displaceable or adjustable either transversely to the longitudinal direction of the airplane or vertically.

At least one damping element 8 is arranged about the spacer sleeve 21 to dampen vibrations, which damping element may be comprised of two damping discs 9, 10 arranged on both sides of the fittings 2, or floor element 3. The damping discs 9, 10 are preferably made of silicone rubber. On the outer side of the spacer sleeve 21, anchoring elements 22 can be provided to fix the damping discs 9, 10, said anchoring elements penetrating into the elastic material of the spacer discs 9, 10, thus fixing the same.

The fastening element 5 is, for instance, formed by a bolt 11, which comprises a bolt head 13 and a thread 12 for screwing the bolt 11 into a respective thread 12' provided in the foot 6. An anti-twist protection formed by a retainer ring can be additionally arranged below the bolt head 13 of the bolt 11. In order to safeguard a flow of forces to the structure for ensuring a form-fit, two discs 15, 16 formed with ribs on their surfaces oriented to each other can further be provided. In addition, a washer 20 can be arranged between the lower damping disc 10 and the fixing device 17, or wedge-shaped piece 18. The ribbed disc 16 and the washer 20 can likewise be provided with anchoring elements 23, which penetrate into the elastic material of the damping discs 9 and 10, respectively, thus fixing the latter. The anchoring elements 22 and 23 enable the floor element 3 to be supplied along with the spacer sleeve 21, the damping discs 9, 10, the ribbed lower disc 16 and the washer 20. This will result in simplified and uncomplicated mounting.

Figure 4:
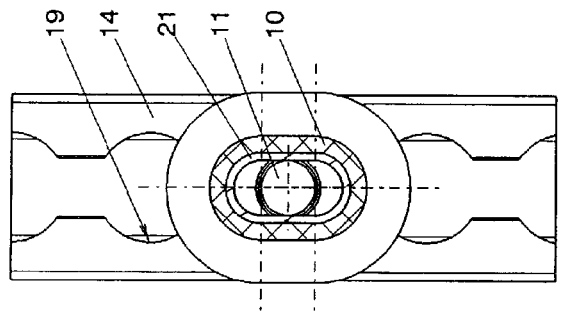
FIG. 4 is a sectional drawing through the fastening device according to FIG. 2 along sectional line IV-IV.
Figure 3:
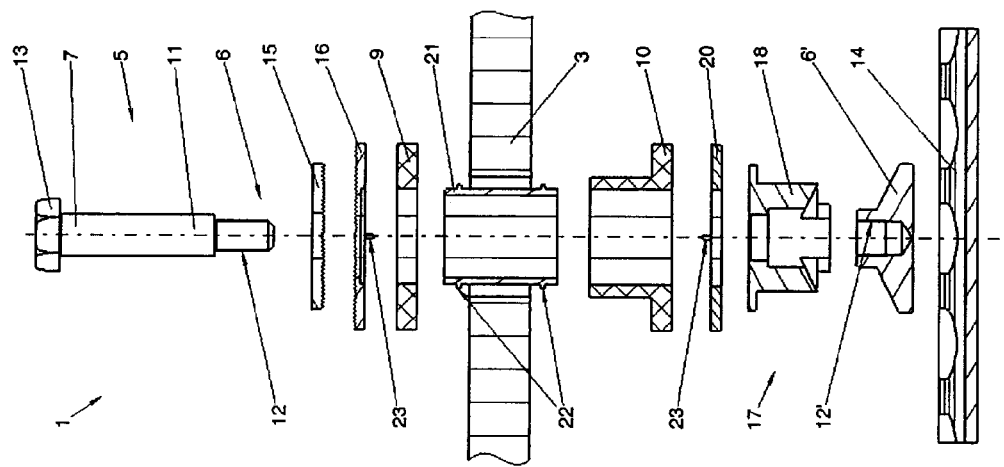
FIG. 3 illustrates the fastening device according FIGS. 1 and 2 in an exploded view.

An elongated hole, which allows for the adjustment of the floor element 3 relative to the fastening element 5, is contained both in the spacer sleeve 21 and in the damping discs 9, 10, the ribbed disc 16 and the washer 20 (cf. FIG. 4).

The height h1 of the spacer sleeve 21 is preferably smaller than the sum of the heights h2, h3 of the damping discs 9, 10 and the height h4 of the fittings 2, or floor element 3, to be fixed. Thereby, optimum vibration-decoupling of the fastening device 1 is achieved.

The bolt 11 and the foot 6' of the fastening element 5 are preferably made of steel. In order to reduce the overall weight, the rail section 14 and the discs 15, 16 are preferably made of aluminum. Also the fixing device 17, in particular the wedge-shaped piece 18, and the optional washer 20 are preferably made of steel due to the higher requirements in terms of strength.

The fastening device 1 according to the invention enables the vibration-decoupled and adjustable connection of fittings 2 in airplanes in particular. In the assembled state, the flow of forces of the initial load takes place via the bolt head 13 of the bolt 11 to the ribbed upper disc 15 and, after this, to the ribbed lower disc and, further on, via the spacer sleeve 21 rather than the damping elements 8. However, before the flow of forces is taken over by the spacer sleeve 21, the damping discs 9, 10 have to be prestressed or compressed by the bolt 11 each by about 0.5 mm in order to ensure damping. This is why the distances or heights h2 of the upper damping disc 9 and the height h3 of the lower damping disc 10 and the height h4 of the floor element 3 together have to be larger than the height h1 of the spacer sleeve 21. The sum of these distances or heights preferably corresponds to the sum of the height h1 of the spacer sleeve 21 and the distance h5. The spacer sleeve 21 is thus pressed downwards until it engages the wedge-shaped piece 18, transferring the flow of forces to the latter. The distance h5 between the lower side of the spacer sleeve 21 and the lower surface of the washer 20 is, for instance, twice about 0.5 mm. The damping discs 9, 10 are thus protected from an excessive compression, which might jeopardize damping.

Figure 5:
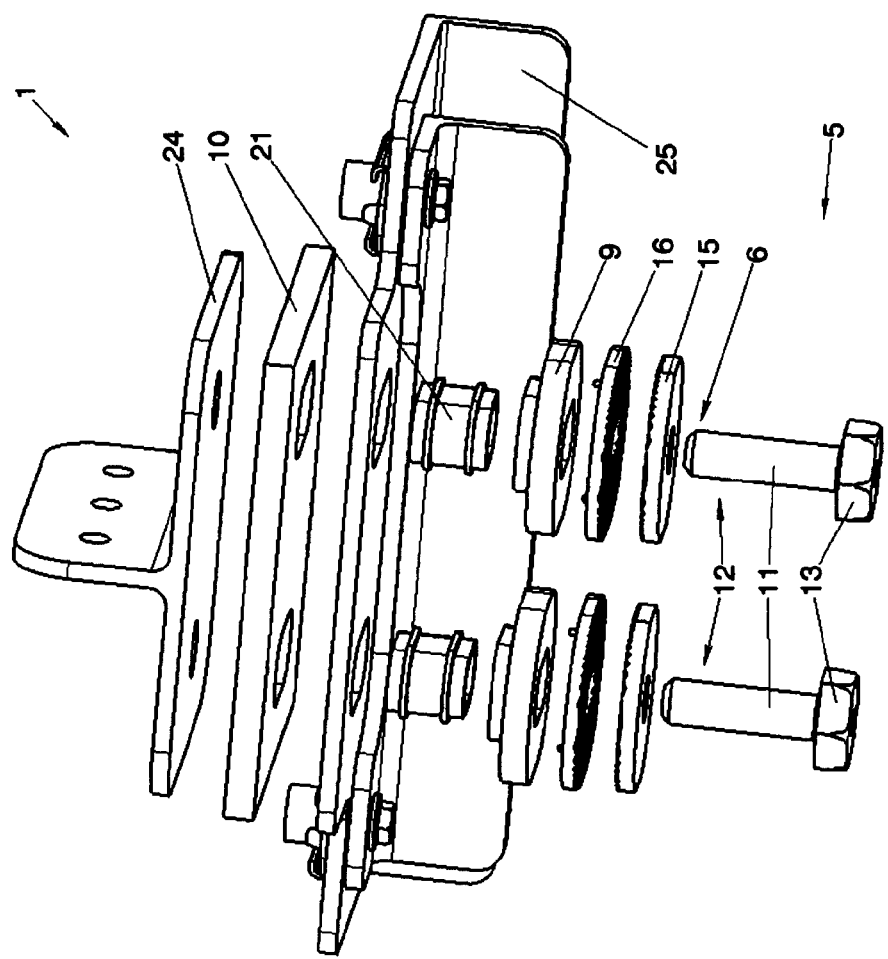
FIG. 5 in an exploded view illustrates an embodiment of a fastening means for fastening a wall element.

FIG. 5 depicts, in an exploded view, a further embodiment of a fastening device 1 for fastening a wall element (not illustrated) to a load-bearing structure 4 (not illustrated). Therein, two fastening elements 5 are arranged one beside the other and each comprised of a bolt 11 with a bolt head 13 and a thread 12. The end 6 of the fastening element 5 is configured for fastening to the structure 4. In the illustrated example, the ends 6 of the fastening element 5 can be connected to a profile piece 24, in particular a T-profile, which can in turn be screwed to the load-bearing structure 4 (not illustrated). The opposite end 7 of the fastening element 5 is displaceably mounted via the spacer sleeves 21 having elongated hole-shaped cross sections, and can be connected to the fittings 2, i.e. a wall element 3 (not illustrated) in the present case, for instance by an appropriate fastening structure 25. Two damping discs 9, 10 of a suitable damping material, e.g. silicone rubber, are provided as damping elements. A positive flow of forces towards the structure is achieved via discs 15, 16 having ribs on their surfaces that are oriented to each other. The spacer sleeves 21 with their elongated hole-shaped cross sections allow for an adjustability to compensate for tolerances. The fastening structure 25 can also be configured to fix two or several wall elements (not illustrated).

The invention claimed is:

1. A device for fastening fittings to a structure such that no vibrations are generated, the fastening fittings each having a height h4, the device comprising:
   a spacer sleeve to be connected to the fittings to be received and configured for fastening to the fittings selected from the group consisting of a wall and floor elements of airplanes, said spacer sleeve having an elongated hole-shaped cross-section and a height h1;
   at least one damping element disposed between the structure and the fittings, said at least one damping element disposed about said spacer sleeve and having at least two damping discs disposed on both top and bottom sides of the fittings, said at least two damping discs are separate, individual components disposed separately on both sides of one of the fittings, said at least two damping discs including a first damping disc having a height h2 and a second damping disc having a height h3, wherein h2+h3+h4>h1;
   a foot;
   a fastening element having a bolt with a bolt head and a thread and defining a first end for fastening to the structure and an opposite, second end having said bolt head for receiving the fittings, said second end of said fastening element movably mounted in said spacer sleeve, said first end of said fastening element having said thread connected to said foot, said foot configured for movable mounting in a horizontal direction in a rail section disposed on the structure, said second end of said fastening element being connectable to the fittings via said spacer sleeve;
   two ribbed discs having surfaces with ribs oriented toward each other and disposed on said bolt, said two damping discs and one of said two ribbed discs having elongated holes formed therein, one of said two ribbed discs having anchoring elements which penetrate into said damping discs for assisting in preventing a rotation of said two ribbed discs locked to each other via said ribs;
   a fixing device for fixing said foot in the rail section.

2. The fastening device according to claim 1, wherein said fixing device has a wedge-shaped piece that can snap into respective recesses provided in the rail section.

3. The fastening device according to claim 1, wherein said damping discs are made of silicone rubber.

4. The fastening device according to claim 1, wherein said bolt is made of steel.

5. The fastening device according to claim 1, wherein said first end of said fastening element has a profile piece connectable to the structure.

6. The fastening device according to claim 1, wherein said spacer element has anchoring elements for penetrating into said damping discs for anchoring said damping discs to said spacer sleeve.

7. The fastening device according to claim 1, further comprising a profile piece connected to said first end of said fastening element, said profile piece is connectable to the structure.

* * * * *